United States Patent [19]

Miller

[11] 3,730,016
[45] May 1, 1973

[54] FRICTION DRIVE DIFFERENTIAL SCREW

[75] Inventor: Donald E. Miller, Mt. Prospect, Ill.

[73] Assignee: Continental Can Corporation, Inc., New York, N.Y.

[22] Filed: June 14, 1971

[21] Appl. No.: 152,937

[52] U.S. Cl. .............................. 74/424.8 B, 74/441
[51] Int. Cl. ......................... F16h 1/18, F16h 55/18
[58] Field of Search ................. 74/424.8 A, 424.8 B, 74/424.8 C, 441

[56] References Cited

UNITED STATES PATENTS

| 2,385,194 | 9/1945 | Carroll | 74/441 |
| 3,380,316 | 4/1968 | Wilkinson | 74/424.8 B |
| 3,128,634 | 4/1964 | Eastman | 74/424.8 C |
| 2,131,151 | 9/1938 | Smith | 74/424.8 C |
| 2,556,572 | 6/1951 | Brinkhurst | 74/424.8 A |
| 2,611,280 | 9/1952 | Brinkhurst | 74/424.8 A |
| 2,616,302 | 11/1952 | Wahlmark | 74/424.8 C |

FOREIGN PATENTS OR APPLICATIONS 846,766   8/1960   Great Britain .................. 74/424.8 A Primary Examiner—Leonard H. Gerin
Attorney—Americus Mitchell et al.

[57] ABSTRACT

A machine for converting rotary motion to rectilinear motion which machine is an anti-friction differential screw. This machine utilizes variations in nut bias force, thread profile, pitch diameter, nut and screw lead angle, double nuts and variations of the combinations to effect different rates of travel per revolution. Other variables are discussed.

33 Claims, 29 Drawing Figures

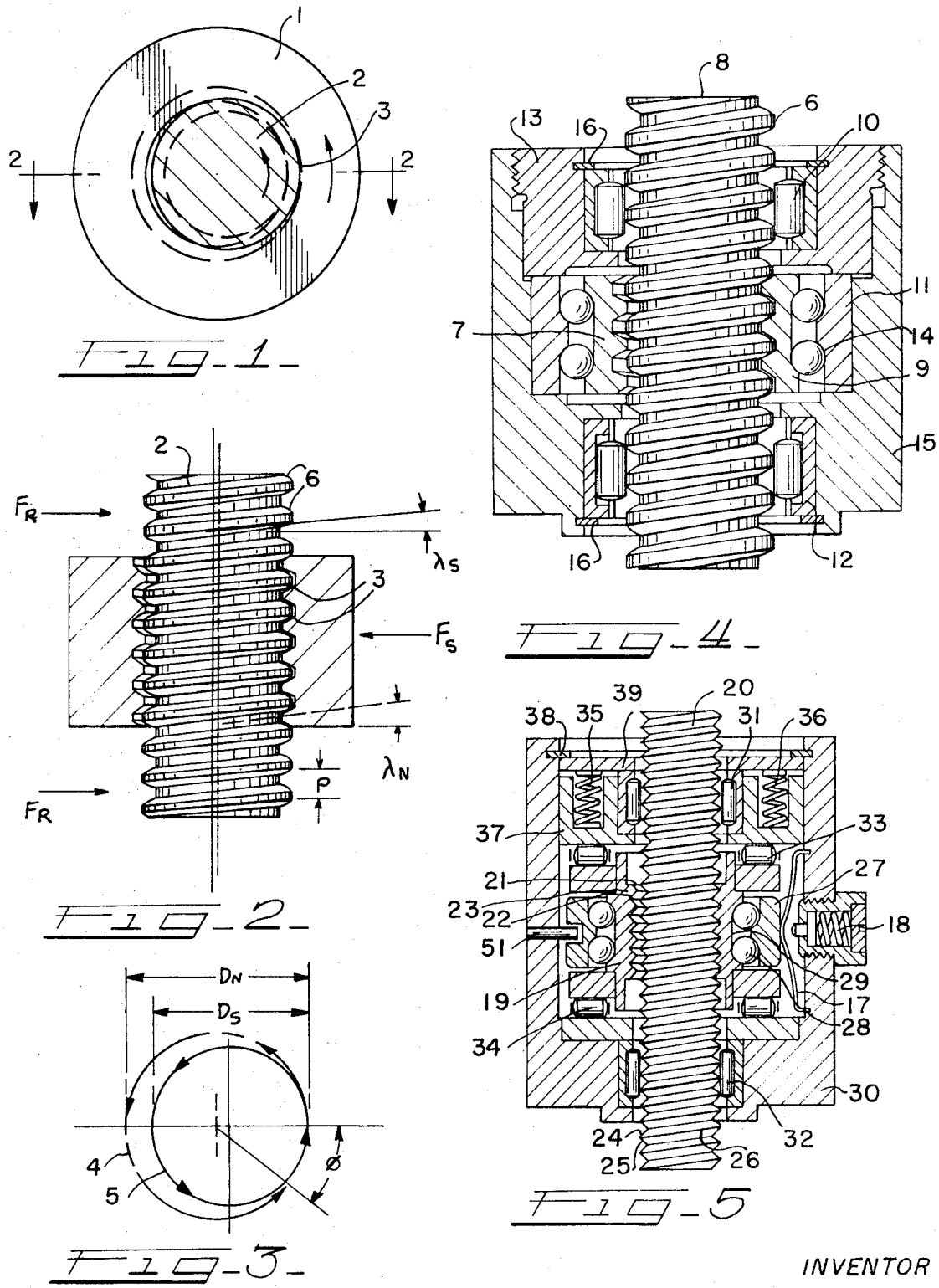

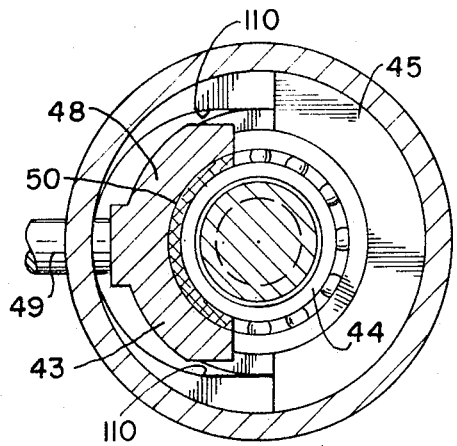
FIG-8-
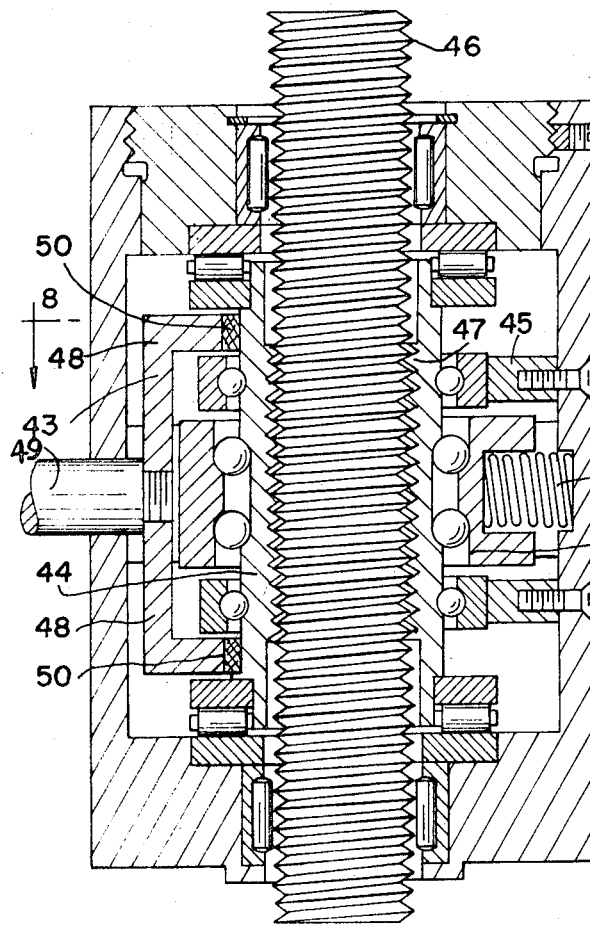
FIG-7-
FIG-6-
INVENTOR
DONALD E. MILLER

INVENTOR
DONALD E. MILLER
BY
ATT'Y

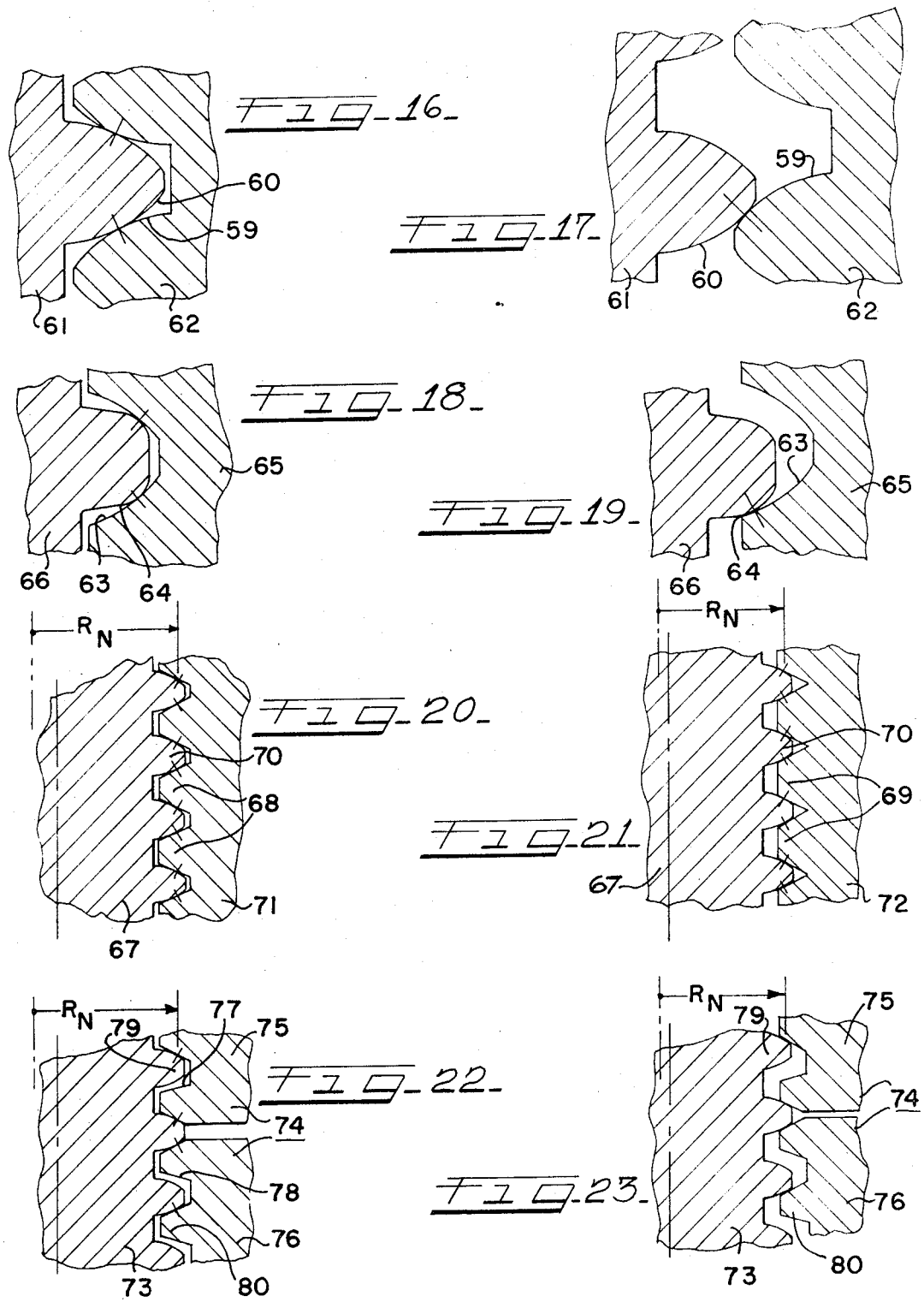

Patented May 1, 1973

INVENTOR
DONALD E. MILLER
BY *Maurice Mitchell*
ATT'Y

INVENTOR
DONALD E. MILLER

BY *[signature]*

ATT'Y

FRICTION DRIVE DIFFERENTIAL SCREW

My invention relates to a mechanism for converting rotary motion into linear motion and more particularly, to a mechanism in which the conversion rate of rotary motion to rectilinear motion may vary according to applied parameters or may be indexed to different rectilinear speeds.

Anti-friction differential screws are known in the art. In these devices, a freely rotatable nut whose diameter and lead angle differ from those of a screw is maintained in firm active contact with the threads of the screw. The screw turns and by tractive contact turns the nut. These devices may be used in automobile jacks, driving of airplane wing flaps and other applications where conversion of rotary motion to rectilinear motion is desired. An example of such a device is found in the patent "Automatic Anti-Friction Dual Ratio Motion Converter" to R. W. Jenny, U.S. Pat. No. 3,295,385 issued Jan. 3, 1967.

It is an object of the present invention to provide a device which can produce very low axial travel per revolution.

It is another object of the present invention to provide a device having self-protection from a driving overload.

It is another object of the device to provide automatic load compensation.

It is another object of this device to provide an infinitely variable axial travel of one element per revolution of a second element.

It is a final object of the invention to provide a device having two directional travel with a uni-directional shaft rotation.

In brief, my invention is drawn to a rotary-linear motion converting machine. A threaded rotatable shaft is rotated inside of a freely rotatable nut. The freely rotatable nut is mounted around the threaded shaft. The pitch diameter of the nut is somewhat larger than the pitch diameter of the threaded shaft. Bias means presses the shaft and nut laterally together so that, under most conditions, their threads engage to give relative axial motion when one or the other is turned. As the shaft and nut rotate, their threads are in tractive contact and the shaft threads roll on the nut threads because of the greater pitch diameter of the nut thread. If a force of sufficient magnitude is applied between the nut and shaft along the longitudinal axis, the nut shifts laterally relative to the shaft and the amount of rectilinear motion per revolution of the shaft is varied by this re-adjustment.

Other important objects and advantages of the present invention will become apparent from the following description taken in conjunction with the accompanying drawings wherein:

FIG. 1 shows a top view of a traction drive differential screw.

FIG. 2 shows a cross-section of the tractive drive differential screw of FIG. 1 taken along the line 2—2.

FIG. 3 shows a diagrammatic illustration of the relative rotation of points of pitch circles of screw and nut.

FIG. 4 shows an elementary anti-friction differential screw actuator.

FIG. 5 shows a cross-sectional view of an embodiment of my invention.

FIG. 6 is a fragmentary view showing an alternate pre-loading arrangement of the embodiment of FIG. 5.

FIG. 7 shows a two speed anti-friction differential screw similar to the embodiment of FIG. 5.

FIG. 8 shows a horizontal cross-section of the embodiment of FIG. 7 taken along the line 8—8.

FIG. 16 shows a convex-convex thread profile mating combination with thread fully engaged.

FIg. 17 shows a convex-convex thread profile with the threads having a contact path along the outer part of the thread profile.

FIG. 18 shows a convex-concave thread profile mating combination with threads fully engaged.

FIG. 19 shows a convex-concave thread profile with the threads having a contact path along the outer part of the thread profile.

FIG. 20 shows a screw in contact with a nut thread of about the same axial thickness as the screw.

FIG. 21 shows a screw in contact with a nut thread of differing axial thickness from the screw.

FIG. 22 shows a screw in penetrating contact with a two-piece nut.

FIG. 23 shows a screw in less penetrating contact with a two-piece nut than is shown in FIG. 22.

Figures 9, 10, 11:
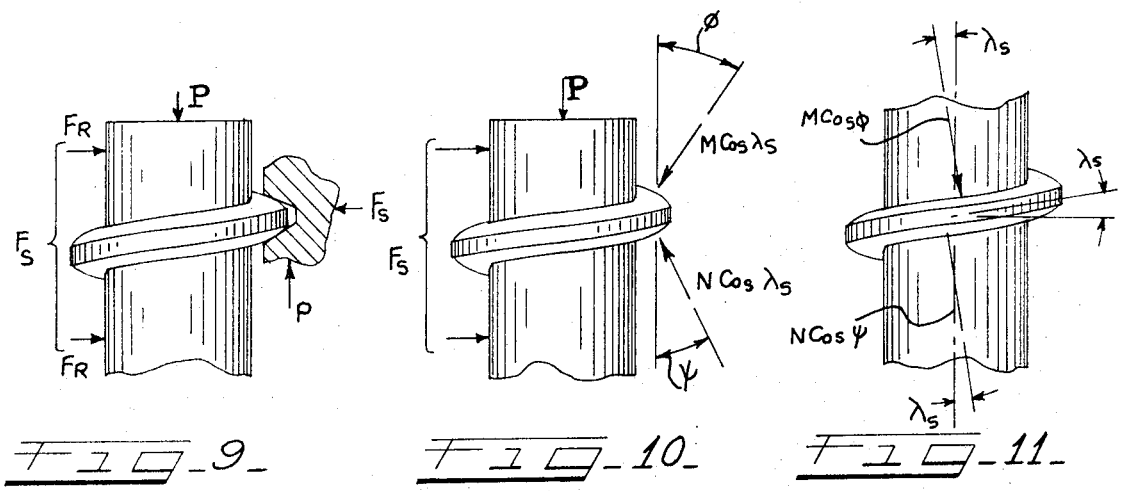
FIG. 9 shows the basic force system acting on a screw and nut when the force along the axis of the screw is large.
FIG. 10 shows a free body diagram of the forces acting on the screw.
FIG. 11 shows a right-side view of the diagram of FIG. 10.

The mechanism shown in FIGS. 1–4 is intended as an explanation of the basic anti-friction differential screw principle. The nut 1 and screw 2 of FIG. 1 are shown rotating in the same direction. The nut 1 is somewhat larger than the shaft or screw 2 and the points of contact 3 between the nut and screw threads are shown to be at the right-hand side of the drawing.

In order for the nut and screw to maintain contact, there must be forces operating against both of them in directions tending to hold them together and maintain tractive engagement between their threads. The forces acting against the screw are shown directed from the left. The force acting against the nut is shown directed from the right. Clearly, the driving means may be either the nut 1 or screw 2 but for sake of discussion, we will consider it as being always the screw. As the screw rotates in tractive contact 3 against the nut, the nut will also rotate with the screw. For the purpose of this discussion, means are assumed to be present for maintaining the nut and screw in firm engagement with each other in all figures. These means are also of such character that both the screw and nut remain freely rotatable. The nut is constrained against any other motion than rotation about its longitudinal axis.

When the screw 2 in FIG. 2 executes one full revolution, a point on one of its threads is initially in contact with a point on the nut. The contact points on the screw follow a path whose projection is a complete circle. This circle is the inner of the two circles shown in FIG. 3. Since the nut can turn freely, rotation of the screw also causes rotation of the nut. However, the nut does not execute a full revolution because its pitch diameter is larger than that of the screw. If nut and screw are of the same relative size as shown in FIGS. 1 and 2, a point on the nut describes a path whose projection 4 is a circular arc of less than 360°. That is to say, the nut does not execute a full revolution. The lengths of the two path projections 4,5 will be virtually identical. Thus, the angle $\theta$ is the difference between the rotations of the screw and nut, per screw revolution. This angle is the angle between the initial contact point of the screw and the corresponding initial contact point of the nut which follows and lags angularly behind the point on the screw because of the greater diameter of the nut.

In the example of FIGS. 1 and 2, the leads of the threads 6,7 of both screw and nut are the same. This difference expressed as a fraction of a whole circle and multiplied by the lead of the screw equals the relative axial travel between the nut and screw.

Looking at this in another way, the axial movement of the screw with respect to the nut can be visualized by imagining that the rotations of the screw and nut occur sequentially, instead of concurrently. First, the screw executes a complete turn, which causes it to move along its longitudinal axis upward a distance equal to its lead. Then, the nut rotates somewhat less than a full turn, which moves the screw downwardly a distance slightly less than the lead.

Therefore, the axial movement is the same as would result from turning the nut backward through the angle $\theta$ with the screw held fixed against rotation. This axial movement will be equal to $\theta$ in degrees divided by 360° times the inter-thread distance when a single threaded nut and screw are used.

Although a common nut and bolt thread is shown in certain figures, preferred thread forms are discussed in relation to these and other figures.

Approaching the situation in a mathematical manner, the differential behavior results from the difference in the lead angles of the screw and nut threads. It can be shown that the axial diaplacement of the screw relative to the nut is expressed by the formula:

$$\delta = p [1 - (\text{Tan}\lambda_N/\text{Tan}\lambda_S)] \text{ inches per screw revolution.}$$

In this equation:
$\delta$ = axial displacement per revolution
$p$ = lead of the screw in inches (inter-thread distance for single thread screws)
$\lambda_N$ = nut lead angle = Arctan $P/\pi$ Dn
$\lambda_S$ = screw lead angle = Arctan $p/\pi$ Ds $D_N$ = 2 times the radius from the axis of rotation of the nut to the point of contact on the nut thread
$D_S$ = 2 times the radius from the axis of rotation of the screw to the point of contact on the screw thread The leads of the screw and nut are the same in most applications of the elementary anti-friction differential screw actuator. When this is the case, the formula can be rewritten in terms of the effective screw and nut pitch diameters as follows:

$$\delta = p [(D_N - D_S/D_N)] \text{ inches per screw revolution } \text{II.}$$

In this equation:
$\delta$ = axial displacement per revolution
$p$ = lead of the screw in inches
$D_N$ = 2 times the radius from the axis of rotation of the nut to the point of contact on the nut thread
$D_S$ = 2 times the radius from the axis of rotation of the screw to the point of contact on the screw thread To cite an example of the low axial travel which can be provided by this mechanism:

if $p = ⅛$ inch, $D_N = 1.0$ inch, and $D_N - D_S = 0.040$ inch, then $\delta = 0.005$ inches per revolution. It is thus clear that very low axial travel per revolution is possible with this device. However, very low axial travel is not a requirement. With high leads and relatively large diameter differences, moderate travel rates are readily achievable.

The anti-friction dual differential screw actuator shown in FIG. 4 includes the screw 8 and nut 9, anti-friction mountings 10,11,12 for these parts, and a housing 15 for the assembly. In this assembly, the bearing 14 for the nut is eccentrically mounted with respect to the screw 8 and screw support roller bearings 10,12. These are located at one end of the housing and at the end cap 13. The end cap clamps the outer raceway 11 of the bearing 14 for the nut 7 into the housing 15. Shaft support bearings 10,12 are retained in position by snap rings 16. In this sample illustrative actuator, the tractive force for rotating the nut 7 is applied by the screw load. This load is applied vertically. If there is little or no load applied between the nut and screw, the nut might not rotate, especially if the bearing offered resistance, as can result from dirt, heavy grease, etc. Moreover, unless all components are of extreme precision, a small clearance exists between the screw and nut at various times in the travel. For this reason, the actuator would exhibit backlash.

FIG. 5 shows a cross-section of an embodiment of my invention. This embodiment is able to function as a precision, backlash-free positioning device and is capable of load-compensation and displacement compensation. In this specification, the property called Load Compensation is defined as the ability to reduce rate of advance automatically as the load increases. The property called Displacement Compensation is defined as the ability to drive a load which moves at any axial rate of advance equal to or less than the nominal advance rate of the actuator. An essential difference between the device of FIG. 5 and FIG. 4 is that a biasing means is shown in the form of a biasing spring 17 of the blade type and a coil spring 18 which is brought to bear after blade spring 17 has flexed sufficiently. The spring 17 has sufficient force to hold the nut 19 into full threaded engagement with the shaft 20 so that the nut thread flanks 21,22 both on the upper and lower surfaces of the thread 23 of the nut engage the flanks 24,25 of the shaft thread 26 in tractive contact. Thus, the biasing spring 17 performs a plural function, i.e., that of insuring no backlash, giving good traction between thread flanks and allowing a variety of contact paths as will be explained later. Biasing force is transmitted through the outer raceway 27, through the ball bearing elements 28 to the inner raceway 29 and to the nut threads 23 of the nut 19. The interior of the housing 30 is arranged to permit movement of the nut 19 and its bearing 27,28,29 laterally to the axis of the screw and in the direction of the spring force, but in no other direction. Needle roller bearings 31,32 support the screw at spaced positions and hold the screw in a vertical position. Axial motion of the nut is prevented by the roller thrust bearings 33,34 consisting of roller-cage assemblies and races. These bearings 33,34 also prevent tilt of the nut 19 with respect to the screw 20 and thus insure that the screw and nut axes remain parallel during operation. This assembly is pre-loaded axially to preclude axial looseness of the assembly itself. One device for providing pre-load is by means of springs 35,36 such as shown in FIG. 5 which press against roller thrust bearings 37 to hold nut 19 firmly in place. The spring pre-load assembly is shown retained by a snap ring 38 and an end plate 39.

Another way of providing pre-load is shown in FIG. 6. In this alternative, the thrust race 40 is threaded into the housing and tightened to provide the desired load on the roller thrust bearings 33. A thread lock 41 such as shown at the right of the drawing would be desirable to maintain the adjustment.

The horizontal nut biasing means of FIGS. 5 and 6 is shown as a blade spring. However, any biasing means is within the scope of this invention since the blade spring might be replaced by coil springs, Belleville washers, pneumatic, hydraulic or electrical load applying devices, or combinations thereof. Such modifications of this device might be advantageous for use in remotely controlled actuators and for varying the force of the horizontal biasing means to fit the application to which this device is to be applied.

Alternatively, the shaft may be fixedly mounted and the housing may be rotated with the same resulting axial displacement.

Critical elements of the first embodiments of my invention are a low friction bearing for the nut, bias means for the nut, displacement restricting means for restricting the travel of the nut to a single path and a particular thread form for nut and screw.

The threads shown in FIGS. 1–8 are of conventional appearance. Thread profiles, different from those shown in FIGS. 1–8, are desirable for nearly all applications of my invention. A reason for this is that the device of FIGS. 5–8 operates on a traction contact stress basis. The nut 19 and and screw 20 make contact only at one or two points on each thread at a given time. The path of contact on each thread surface is a curved line, rather than an area spanning the face of the thread. It is true, of course, that the points broaden into "spots" under load. Excessive surface stresses can be avoided and satisfactory thread life assured by proper design of the profiles of the mating threads. In the preferred mode of operation, there is little sliding between the thread surfaces. Since there is little sliding at the points of contact between the thread surfaces, there is little wear of the thread surfaces.

Shown in FIGS. 7 and 8 is a modification of my embodiment of FIG. 6. This modification incorporates a coil spring 42 in place of a flat spring for biasing means. The modification of FIG. 7 is a two-speed screw actuator. When the brake 43 is not applied, the device operates in all respects similarly to the device of FIGS. 5 and 6. However, the brake 43 may be applied from the left and moves the nut 44 toward the right. When the nut has moved its maximum distance to the right, it is centered in the nut centering bearing against a positive stop, the nut centering crescent 45. At this position, the threads 46 of the screw are in contact with the threads 47 of the nut for the full length of the nut threads. The long contact path distributes the stress and wear along the length of the nut thread. Also, when the force actuating brake 43 is pressed against the nut, the rotation of the nut is halted and the nut becomes a fixed nut operating in the usual fashion of such nuts. In this situation, the device operates as a threaded shaft moving through a fixed threaded nut, in other words, as a conventional power screw. The rectilinear motion of the shaft per revolution is equal to the lead of the threads on the shaft.

The brake mechanism shown in FIGS. 7 and 8 has brake shoes 48 at the end of a force actuating shaft 49. The shaft is in the shape of a Y with the arms of the Y contoured to fit against the exterior of the nut 44. Appropriate friction linings 50 are fastened onto the brake shoe and are designed to stop rotation of the nut. A coil spring biasing means 42 is shown instead of a leaf spring. By use of the coil spring, the alignment pin 51 (FIG. 5) can be eliminated. The coil in this modification has the function of biasing the outer raceway 52 and of restraining the outer raceway of the nut bearing from rotation, a coil spring of this sort could be used in any embodiment of my device. The shape of the brake shoe 48 and brake shoe lining 50 is shown most clearly in FIG. 8. Nut 44 is shown in its centered position with the brake applied to halt the rotating motion of the nut.

Thread form is a primary factor affecting the operational properties of my device. Thread form strongly influences the load-compensation, displacement-compensation, and self-protection characteristics of my device. These characteristics, and the influence of thread parameters on them, can be understood most clearly by referring to FIGS. 9 through 11. These figures for clarity consider only one thread at a time although in actual practice, the load is distributed over several threads.

The externally applied force P is shown in FIG. 9 as acting downwardly on the shaft. This force causes a force to act on the lower surface of the shaft thread through the upper surface of the nut thread. Of course, the externally applied force can also be applied through the lower surface of the nut thread if it is applied directly to the nut. However, in this explanation the externally applied force P is considered as applied downwardly to the shaft. Force, $F_S$, is the bias spring force shown here as applied from the right in FIG. 7. Force, $F_S$, is transmitted to the shaft, to the needle bearings and to the housing. The forces of reaction, $F_R$, shown at the left are the forces opposing the bias force, $F_S$. These forces are shown as directed from the left toward the right. The sum of both reaction forces, $F_R$, is equal and opposite to bias force, $F_S$.

FIG. 10 shows a free body diagram of the screw and of the individual forces acting on the screw. Each vector length is shown of a particular length or magnitude for purposes of illustration only. Clearly, the forces acting on the screw vary depending upon the situation and this brings about different forces of reaction of varying magnitudes. The external thread of the screw is acted upon by two forces M and N which are not usually coplaner. Since these forces are not in opposition, they subject both the nut and screw to moments which attempt to tilt them off axis and cause moderate additional loading of the screw and nut support bearings. However, these forces do not influence the kinematic behavior of the mechanism significantly. As indicated above, the magnitudes of the forces M and N are generally not the same. The magnitudes of these forces depend chiefly on five factors. These factors are the biasing force chiefly S, the lead angle $\lambda$, the contact point thread profile angles $\phi$ and $\psi$, and the external load P. M and N will be equal if there is no external load and the thread profile contact angles $\phi$ and $\psi$ are equal.

The right side view of the screw of FIG. 10 is shown in FIG. 11 with a different perspective of the forces.

M is less than N when the external load P is applied. As the load P becomes greater, the magnitude of M becomes lesser and the magnitude of N increases. If the load is progressively increased, a value of P is finally reached at which the magnitude of M becomes zero. When this happens, the force system acting on the thread becomes that shown in FIG. 12.

Suppose that the vertical force applied on top of the shaft of FIG. 9 continues to increase: then the resulting effects depend, in the main, upon the profile angle $\psi$ and the coefficient of friction $\mu$. If the quantity $$\text{Tan } \psi - (\mu/\text{Cos } \lambda) \leq 0 \qquad \text{III.}$$

the screw continues to advance at approximately the same linear rate no matter how large the force P becomes until some component fails. However, under the condition $$\text{Tan } \psi - (\mu/\text{Cos } \lambda) > 0 \qquad \text{IV.}$$

i.e., where the quantity is positive, the screw advances only until the force P attains the critical value defined, approximately, by the expression $$P_C = F_S (\text{Cos } \lambda + \mu \text{ Tan } \psi/\text{Cos } \lambda \text{ Tan } \psi - \mu) \qquad \text{V.}$$

In this equation:

$P_C$ = the external vertical load required to cause relative lateral movement between the nut and shaft.

The other symbols are identified in the preceding discussion.

Figures 12, 13:
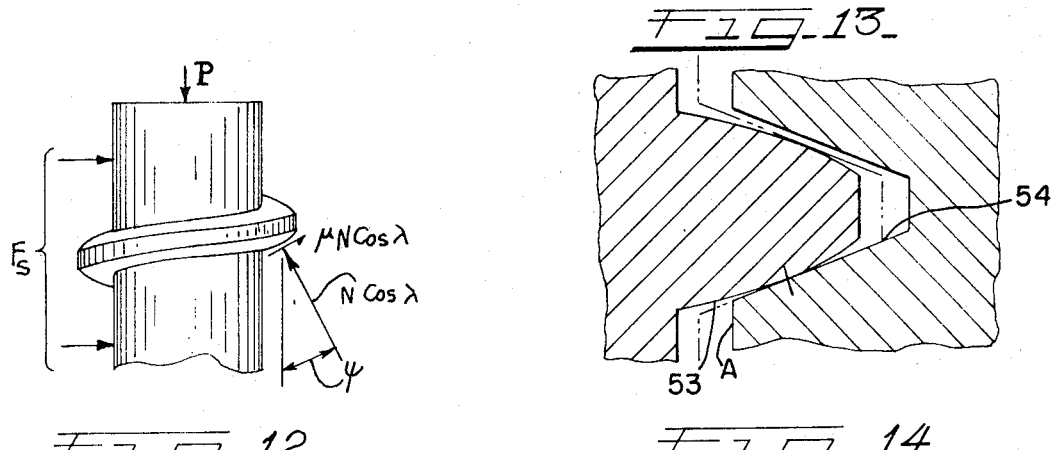
FIG. 12 shows an analysis of the force system when the force along the axis of the screw is large.
FIG. 13 shows the contact geometry when the force along the axis of the screw exceeds the critical load value.

When the load force P rises above this value, the nut is forced laterally away from the screw. The contact geometry between the nut thread and the screw thread is shown in FIG. 13. Since the nut has been displaced to the right, the effective diameter of the nut has been decreased, the axial travel of the nut thread per screw revolution increases and the relative axial travel between nut and screw declines. This is because the lead angle difference between nut and screw becomes lessened and the lead angles of nut and screw are closer, one to the other.

If thread profiles 53,54 of the type shown in FIG. 13 is used in conjunction with a conventional biasing spring, the critical load, $P_C$, increases somewhat during lateral displacement of the nut, because the spring force $F_S$ increases. Nonetheless, lateral displacement of the nut continues as long as the load force P rises above the critical value indicated. The nut does not come to an "equilibrium" position unless the force system becomes altered.

If the inside diameter of the nut is larger than the outside diameter of the screw, the nut can displace laterally until its threads become completely disengaged from those of the screw. In most cases, this behavior is undesirable, and a positive stop is provided to limit the lateral displacement of the nut. On the other hand, if the inside diameter of the nut is less than the outside diameter of the screw, as in FIG. 2, the lateral movement can continue only until the nut becomes closely centered with respect to the screw. Lateral equilibrium then occurs as the condition of engagement between nut and screw threads changes from point contact to continuous line contact over the full length of the nut thread.

Under this thread engagement condition, the lead angle of the nut becomes equal to the lead angle of the screw and the screw ceases to advance even though it and the nut continue to turn. This condition is one under which the paths of contact of nut thread and screw thread for 360° of turn are equal one to the other. Screw and nut rotate in unison as if they were a single element. None of the parts of the actuator are harmed by continued operation in this state. The device simply functions as a powered clamp, providing force but the screw does not advance. This operating characteristic provides inherent self-protection to the device. Thus, depending upon the amount of bias force, $F_S$, if axial movement of the screw is obstructed, the actuator applies a certain maximum force to the obstruction but ceases its advance.

My device has further the property which may be called Displacement Compensation. This property is displayed when the load being driven is capable of advancing or being advanced but for some reason or other, such as inertia, advances at a different rate from that which the actuator is attempting to cause it to advance. For this property to come into play, the load must advance more slowly than the rate of advance which the actuator attempts to provide. Under this condition, the actuator accommodates its own travel to that of the load. The nut moves laterally (FIG. 13) to a position A at which its lead angle coacts with that of the screw to provide the rate of advance which the load is undergoing. At the same time, the actuator maintains force $P_C$ defined by equation (V.) above against the load. This property is useful in applying load force against a drill bit, for example, which is rotating in a cutting mode against a nonhomogeneous material, such as earth or rock. A relatively constant force is exerted downwardly against the drill bit so that the drill bit is not overloaded but due to the varying consistency of the material being cut, the rate of travel of a drill but might vary appreciably from material to material. Another example is the tapping of holes in machine parts. If used as a taping machine feed, the actuator self-adjusts to any tap thread and at the same time keeps the tap under axial compression.

The property which may be termed Load Compensation differs from Displacement Compensation only in the range of variation of the force $P_C$ during lateral displacement of the nut. In Displacement Compensation, the lateral spring force, $F_S$, and thread profile parameters should be selected so as to maintain $P_C$ relatively constant. In Load Compensation, this force is made variable with the lateral displacement of the nut. Thus, in Load Compensation, force $F_S$ may be applied by a stiff spring (i.e. high rate spring) or any other medium which applies a force which varies significantly with lateral displacement.

Consider the situation where the force $F_S$ increases substantially with lateral displacement of the nut. It is seen that force $P_C$ (Equation V) then also rises significantly as the nut undergoes lateral displacement. The relationship between load and rate of travel is inverse (i.e., the greater the load, the slower the rate of travel). Loads less than the design minimum, i.e., the minimum value of $P_C$, advance at the nominal differential rate. Loads greater than the design maximum will not advance at all. Loads between the design minimum and the maximum will be moved at intermediate rates, the higher the load the lower the rate of advance.

This is because as the load is applied, the nut moves to the right (FIGS. 5, 13) an amount depending upon the magnitude of the load. As the nut moves to the right, the lead angle between nut and shaft diminishes and the greater the load, the more the nut movement to the right and the slower the rate of advance of the shaft.

The load compensation property itself may be varied by varying the magnitude of the lateral force $F_S$ with this, axial displacement or axial rate of displacement to suit the application under consideration for my device.

Figure 15:
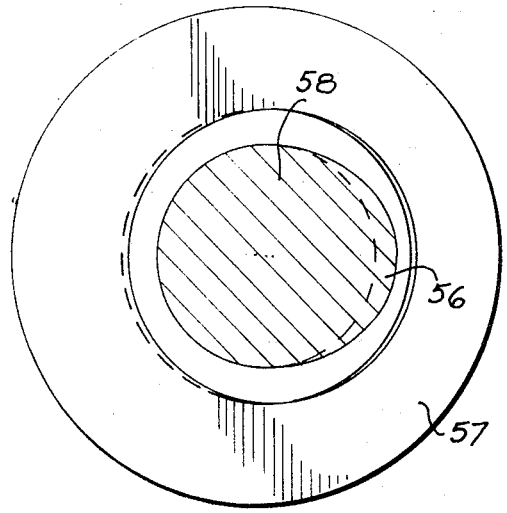
FIG. 15 shows a top view taken along the line 15—15 of FIG. 14.
Figure 14:
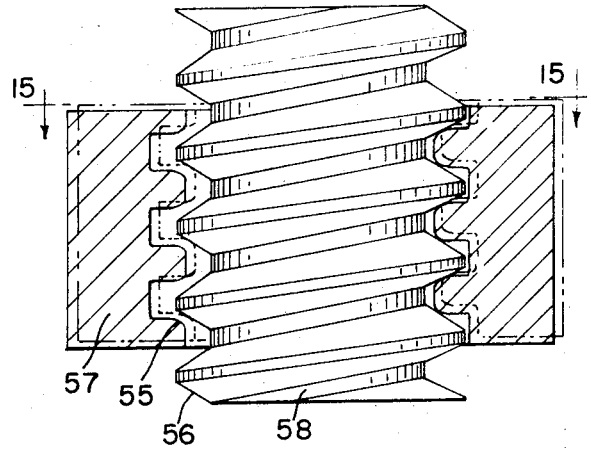
FIG. 14 shows a broken away view of an embodiment having a crowned nut thread and a straight screw thread.

In the thread profile sketches of FIGS. 16–19, the screw thread is shown as having convex flanks. In these figures, the nut thread flanks are concave or convex. As pointed out in the paragraphs immediately above, as a variant, the nut thread 55 may be crowned and the screw thread 56 straight (FIGS. 14 and 15). In this situation when the load exceeds the critical value and the nut 57 moves laterally, the effective pitch diameter of the screw 58 increases instead of the nut diameter decreasing. This is the reverse of the situation shown in the four figures above where the nut diameter decreases. The effect on the relative axial travel is the same. The solid lines indicate the relative position of screw and nut at loads below the critical. The relative positions after the nut has displaced laterally to the zero travel position are shown in phantom lines.

As another illustration of the possible variations in thread profile, consider the case of the nut thread flank 59 and screw thread flank 60 having convex profiles, FIGS. 16 and 17. In this situation, the pitch diameters of both screw 61 and nut 62 are changed during lateral displacement of the nut. Further, the contact angle $\psi$ would increase. The critical load formula V previously given shows that if $F_S$ is constant, $P_C$ decreases with increasing $\psi$. A load P which is just sufficient to induce incipient lateral motion of the nut is then more than large enough to cause it to continue moving laterally. Therefore, this type of crowning provides a modified snap-action characteristic. If thread flanks 59,60 have this profile, then when the critical load is reached, the nut very rapidly shifts to the zero axial travel position and remains there until the load is reduced well below the critical value. FIGS. 16 and 17 illustrate the thread engagement conditions prior to and after the shift occurs.

Convex profiles (FIGS. 16 and 17) in conjunction with a dual spring arrangement of the type shown in FIG. 5 provide dual speed travel with automatic shift as a function of load. Moreover, in contrast with the two-speed device of FIGS. 7 and 8, both speeds are carried out in the differential mode of operation, which does not involve gross sliding between screw and nut threads. The device operates as follows. At loads below the critical, thread engagement of the type illustrated in FIG. 16 exists. The rate of axial advance is the highest differential mode rate of which the particular screw and nut combination is capable. If the load increases to the critical value, nut 62 abruptly shifts until it contacts the second spring device 19 (FIG. 5) which is preloaded to some value $F_{S2}$. The lateral position at which the nut 62 makes contact with the second spring device is selected to provide the desired second rate of travel. The second spring device 19 prevents displacement of the nut 62 to the zero travel position at loads above the critical but below the design maximum load. The design maximum load is not that load which initiates further lateral shift of the nut to the zero travel position against the combined spring force $F_S$ and $F_{S2}$.

This concept could be extended to provide three or even more speeds by providing more springs with the shifts from one speed to the next automatic and load dependent. With high lead, multiple thread screw and nut, a broad range of load-speed combinations could be provided.

As another possibility of varying thread flank profiles, FIGS. 18 and 19, a concave profile 63 is mated to a convex profile 64 provided the radius of curvature of the concave profile 63 is larger than that of the convex profile 64. This combination produces an increasing load characteristic during nut displacement. As the nut 65 moves to the right, the angle $\psi$ diminishes and for this reason, greater load force P is necessary to induce nut movement against a constant lateral force $F_S$. Therefore, the concave-convex profile combination exhibits properties similar to those of a convex-straight profile combination with a stiff (high-rate) spring providing the force $F_S$. In other words, it exhibits Load Compensation. It has the advantage that the pitch diameters of both screw 66 and nut 65 change during lateral movement of the nut, which tends to minimize contact fatigue and wear on both members.

The discussion and figures presented so far consider only profiles for which the same type of curvature is present over the entire thread flank. A thread need not be constructed this way. A portion of the flank might be of straight profile and the remainder curved. A profile with both convex and concave portions on the same flank is even possible. Furthermore, a thread profile need not be symmetrical; i.e., the two flanks do not have to be mirror images of one another. They may exhibit different slopes and/or curvature. A thread combination of this type could be designed to exhibit Load Compensation for loads exceeding the critical in one direction and snap-action to zero travel for loads greater than the critical in the other direction.

One consideration is present in the designs of unsymmetrical threads that does not exist for symmetrical profiles. Unless special care is taken in design, the contact radii (distance from the axis of the screw, or nut, to the point of contact) will not be the same on the two flanks of a thread profile. This can lead to excessive sliding at one, or both, of the contacts, especially if the screw and nut diameters differ appreciably.

From the foregoing, it is readily apparent that a variety of combinations of thread profiles induces different travel versus load characteristics.

Another embodiment of my device has the characteristic of infinitely variable axial displacement per revolution. The explanation and illustration of the embodiment having this characteristic is shown in FIGS. 20 through 24.

FIGS. 20 and 21 show a screw 67 in contact with nut threads 68 and 69 having the same pitch but different axial thickness. The screw is assumed to be the same in both cases. The nuts are also the same except for the difference of thread thickness. The nut having the thicker thread 69 penetrates less deeply into the thread 70 of the screw (FIG. 21) than does nut 71 shown in FIG. 20. That is to say, the nut contact radius $R_N$ of the nut 71 in FIG. 20 is greater than the nut contact radius $R_N$ in the nut 72 in the illustration shown in FIG. 21. The lead angles of the nuts are different in the two cases and, therefore, the axial displacement per revolution of the shaft with these two nuts is different.

FIGS. 22 and 23 illustrate a type of screw 73 and nut 74 having properties somewhat similar to those shown in FIGS. 20 and 21. However, in FIGS. 22 and 23, the nut is split into top and bottom halves 75,76. Further, the upper flank 77 of the threads in the top half 75 and the lower flank 78 of the threads in the bottom half 76 are relieved, so that contact occurs on only one flank of the threads in each nut half. FIG. 20 shows approximately the same penetration as that of FIG. 22. In FIG. 22, nut 74 is shown as penetrating fairly deeply into the screw threads 79. In FIG. 23, the two halves 75,76 of the nut have been moved closer, one to the other, and by this means alone, the distance $R_N$ has been decreased and the penetration of nut threads 80 into screw threads 79 is diminished. The two combinations shown as FIGS. 22 and 23 are obtained with the same compound nut 74, simply by changing the amount of separation of its two parts 75,76. The effect of contact radius $R_N$, and hence on nut lead angle, is the same as resulted from nut threads of different thickness in FIGS. 20 and 21. One arrangement for changing the separation of these nuts is illustrated in FIG. 24 as another embodiment of this invention.

Figure 24:
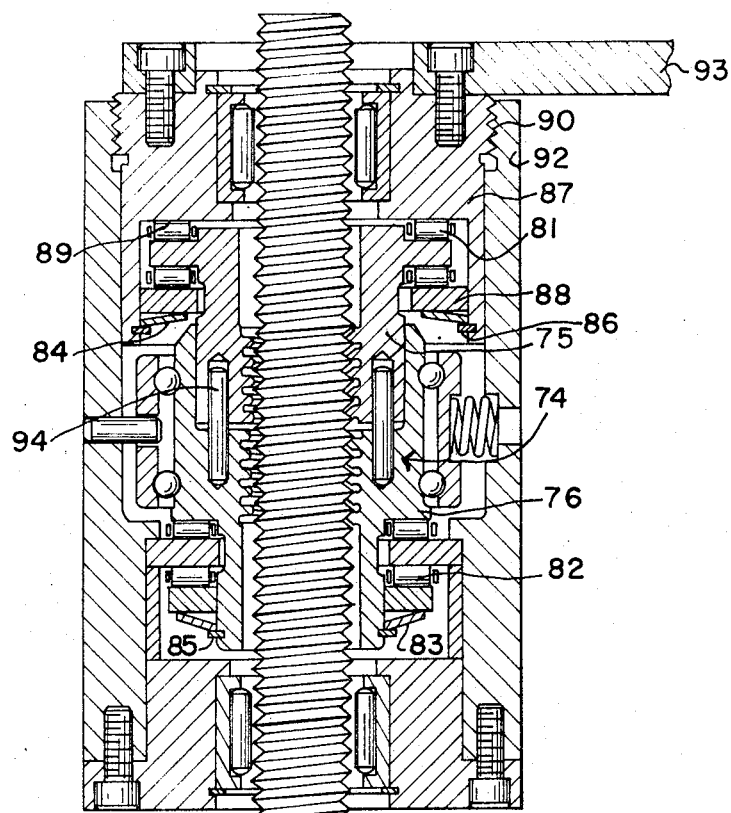
FIG. 24 shows another embodiment of the invention having a compound nut for infinitely variable axial travel.

FIG. 24 differs in its organizational structure from the embodiment of FIGS. 5 and 7 primarily because the compound nut 74 is split into two nuts 75,76. These nuts are restrained from rotation relative to each other but axial displacement between them is permitted. The associated machine elements to accomplish this result are illustrated in FIG. 24 and will be outlined below.

The nuts 75,76, each being about one-half of the compound nut, are retained in preloaded double thrust bearings 81,82, one above and one below. The double thrust bearings are provided with Belleville spring washers to put them in compression. There is one spring washer for each preload double thrust bearing.

The Belleville spring 84 and the snap-in fastener 86 below it act along with the mounting 87 for the upper bearing as a means for moving upper nut 75 axially in either direction. The Belleville spring 84 compresses against the lower race 88 of the preloaded thrust bearing and keeps the preloaded double thrust bearing 81 pressed snugly against the upper race 89 of this bearing. In this way, when the mounting of the upper bearing is moved up or down, the bearing 81 and upper nut 75 move with it. Any means that one desires may be used to move the mounting 87 for upper bearing 81.

As shown here, threads 90 may be machined onto the exterior 91 of the upper bearing in the outer casing 92. A lever 93 is attached to the mounting 87 of the upper bearing for rotation of the upper bearing mounting. When upper bearing mounting 87 is moved in rotation, it moves upwardly or downwardly depending upon the direction of rotation. The advance or retraction of the upper bearing alters the separation of the nut halves. Relative rotation of nut halves 75,76 is prevented by guide pins 94. The change of distance between the two nuts of the compound nut produces an effect similar to that shown in FIGS. 22 and 23. The total axial adjustment is never larger than a fraction of the screw pitch. Therefore, the adjustment is carried out rapidly. A shift in speed from full travel to zero travel in less than one revolution of the screw is possible.

The travel adjustment mechanism illustrated in FIG. 24 requires a small operation clearance for threads in the upper mounting. However, the spring force $F_S$, in conjunction with the thread profile angles, produces a separating force between the nuts which should keep the adjustable bearing mount biased into contact with one flank of the adjusting thread. For this reason, the mechanism is free of backlash. It is possible, of course, to use a preloaded, lash-free adjustment mechanism should it become necessary.

The device of FIG. 24 is normally used only at loads below the critical, where its rate of advance is governed by the existing setting of the travel adjustment mechanism. Loads above the critical lead to lesser rates of advance or even zero advance, and hence for most uses of the device are considered overloads. This should not be taken to mean that such loads damage the actuator. They merely cause it to deviate from the intended mode of operation.

Dual speed axial travel is obtained with the device shown in FIG. 24 by having the adjustment drive locate the upper bearing mounting at one or the other of two designated positions. Obviously, a three, four or more speed drive is achievable in the same fashion. However, all such discrete travel rates lie within the limited speed range which is characteristic of the differential mode of screw and nut operation of the specific machine. If two vastly different rates of axial travel are desired, the basic actuator is modified internally as shown in FIG. 7 by the addition of mechanisms which (1) relieve the screw-nut traction forces $F_S$, and (2) lock the nut against rotation. Large differences in axial travel are possible between the power-screw mode and the differential mode. These differences may exceed 50-1.

In all of the embodiments depicted or described so far, the screw and nut threads have the same lead. That is, a single-thread nut and single-thread screw, or double-thread nut and double-thread screw, etc., have been described or implied. Such matching of the screw and nut leads is not required; only the pitch of nut and screw threads must be the same. Therefore, it is possible, for example, to design an actuator with a single-thread screw and double or triple, etc. thread nut. The inverse is also true. A multiple-thread screw can engage a single thread nut. However in this case, the lead angles of the screw and nut are inherently widely different; such a screw-nut combination would exhibit high axial travel, e.g., travel comparable to its screw lead.

The characteristics of screw-nut combination which do not have the same lead are in many respects different from the properties previously described. Combinations in which the lead of the nut is a multiple of the screw lead can be designed to exhibit properties of special interest.

In the discussion which follows, the terms advance and retract have the following meaning. A screw with right-hand thread is said to advance if it moves away from an observer when it is rotating clockwise, or toward him when rotating counter-clockwise. A left-hand screw is said to advance if it moves away from an observer when turning counter-clockwise and toward him when rotating clockwise.

In like fashion, a right-hand screw is said to retract if it moves toward an observer when rotating clockwise, and away from him when rotating counter-clockwise. A left-hand screw retracts if it moves toward an observer when turning counter-clockwise and away from him when turning clockwise.

Figure 25:
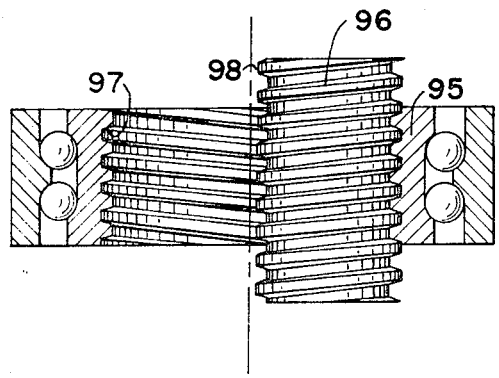
FIG. 25 shows a double-threaded nut operating with a single threaded screw.

Consider a combination of a double-thread nut and single-thread screw, as in FIG. 25. In this figure, suppose the pitch diameter of the nut for loads less than the critical load is slightly greater than twice the pitch diameter of the screw. Then the lead angle of the screw will be greater than that of the nut and the screw will advance at the design rate. For operation as set forth below, the inside diameter of the nut is less than two times the outside diameter of the screw and the thread root diameter of the nut is greater than two times the outside diameter of the screw.

Now suppose that the load increases to a value above the critical, giving rise to lateral displacement of the nut. As in the case of a nut and screw with the same lead, the nut 95 will continue to displace as long as the load remains above the critical. The lead angles of nut 95 and screw 96 approach each other and finally become equal. Thus, the rate of axial advance declines to zero when the lead of both nut and screw are equal. However, nothing is present to prevent further lateral displacement of nut 95. As nut 95 continues to displace, its pitch diameter becomes less than twice the pitch diameter of the screw. Therefore, its lead angle becomes greater than the screw lead angle, and the screw 96 begins to retract. This state of affairs will continue, with the rate of retraction increasing with further lateral displacement of the nut. The nut becomes completely disengaged from the screw unless a lateral movement position stop is present. If a stop is present, the nut will displace to the stop, and the rate of retraction will reach its maximum.

Thus, when the nut thread 97 is some multiple of the screw thread 98, it is possible to design an actuator which advances, retracts, or does both. The particular behavior of the actuator in response to various types of loads are a function of thread profile design and the properties of the system which provide the bias force $F_S$.

For example, if a convex-convex profile combination (FIG. 16) is used, the actuator shifts abruptly from maximum rate of advance to maximum rate of retraction when the critical load is reached. It does not shift back to advance until the load declines well below the critical. Thus, if the actuator is driving a resilient load, such as a spring, it actually oscillates automatically, advancing against the load until the load reaches the critical value, then retracting from the load until a value below the critical is reached, then advancing once again, etc.

On the other hand, if the load is a rigid obstruction, so that the load force P virtually disappears as soon as the actuator begins retracting, the device undergoes very low amplitude motions toward and away from the obstruction, and in consequence applies a pulsating force to it.

An actuator with convex-straight profile combination or a convex-concave combination would not behave in this fashion upon encountering either a resilient load or an obstruction. It would simply apply increasing force to the load while declining in travel until it reached the zero travel operating condition.

The property of two direction travel would exist only for nut mean pitch diameters approximately n times the screw pitch diameter where n is (nut lead)/(screw lead) ratio. That is, it would exist when the nut diameter was twice the screw diameter, for a combination of double-thread nut and single thread screw, or when the nut diameter was three times the screw diameter, for a triple-thread nut, single-thread screw combination.

For nut pitch diameters which always remain greater than n times the screw pitch diameter, the lead angle of the nut would always be less than that of the screw. The screw would therefore advance. Furthermore, at loads above the critical, the rate of advance would decline regardless of load direction. These properties are the same as those exhibited by an actuator with nut and screw having the same lead. For nut pitch diameters which always remain less than n times the screw pitch diameter, the lead angle of the nut would always be greater than that of the screw. The screw would therefore retract. Moreover, at loads above the critical, the rate of retraction would increase, regardless of load direction. These characteristics cannot be achieved in an actuator with nut and screw having the same lead.

From the foregoing, it can be seen that not only can actuators be designed to change speed automatically as a function of load, but that the speed-load relationship can be either inverse or direct.

The use of nuts with leads which are some multiple of the screw lead also permits the design of an actuator capable of infinitely variable, two-direction axial travel. This is accomplished by making the mean pitch diameter of the nut equal to n times the mean pitch diameter of the screw, and designing the nut to be of the two-piece type described previously in conjunction with the embodiment of FIG. 24. It should be evident that the general arrangement shown in that figure could be readily adapted to accommodate a nut of the required type.

In this embodiment of my actuator, the nut pitch diameter range is designed to include values for which nut lead angles are both greater than and less than the screw lead angle. Remembering that it is the interthread tractive contact path which ultimately determines the screw angle, then it is readily seen that when the nut lead angle is greater, the screw will be retracted. When the screw lead angle is greater, the screw will progress through the nut. When the nut lead angle exactly equals the screw lead angle, then the screw rotates in place. Where a double-threaded nut is used, the mean pitch diameter of this double-threaded nut is chosen approximately equal to twice the pitch diameter of the screw. The screw advance occurs during operation at effective pitch diameters greater than this value and retraction takes place at effective diameters less than the screw diameter.

Figure 26:
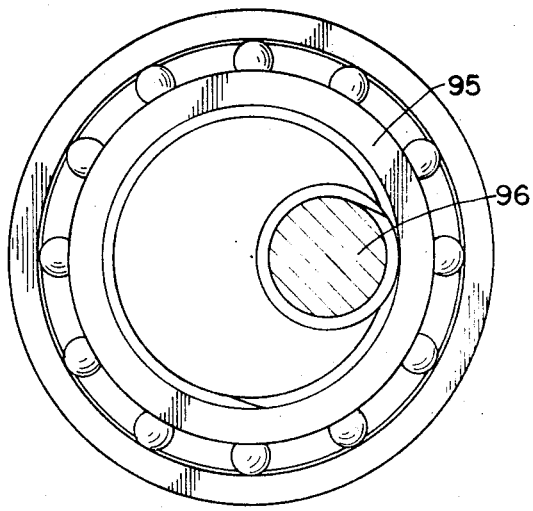
FIG. 26 shows a top view of the nut and screw of FIG. 25.

In situations involving relatively high axial speed of the screw, a double thread may be incorporated on the screw and a quadruple, or sextuple, etc., thread on the nut. This type of arrangement is shown in FIGS. 25 and 26 where the number of threads on the nut is twice that of the screw. This arrangement can be applied to the embodiments of FIGS. 5, 7 and 24.

The use of nuts having leads which are multiples of the screw lead would not be confined to providing two-directional axial travel. Multiple-thread nuts having two, three, four or five threads could be used with a single-threaded screw. They would permit lower nut rotational speeds and thereby reduce the number of contact stress cycles to which points on the nut thread would be subjected. In this connection, it should be remembered that the screw is usually many times longer than the nut. Points on the nut thread operate under much more severe conditions from the fatigue standpoint than do points on the screw thread. The large diameters of the multiple thread nuts have another advantage. They provide a crescent-shaped space between the screw and nut which is large enough to accommodate other elements. In particular, a biasing means for providing the force $F_S$ could be located in this space. A biasing means so located would subject the screw to much lower bending moments than the arrangements previously shown. This characteristic could be of considerable importance in actuators designed to operate with high tractive loading, e.g., high $F_S$, or in designs in which the screw support bearings were widely spaced.

The foregoing specification has been concerned chiefly with devices in which the lead angles of screw and nut do not differ appreciably. However, actuators constructed generally as shown could be made in which the nut and screw lead angles were substantially different. Nuts with pitch diameters large compared to those of the screws would usually be required to achieve satisfactory contact conditions. It would even be possible, however, to use a nut with negative lead in conjunction with a screw having positive lead, i.e., a nut with a left-hand thread and screw with right-hand thread.

The previously given formula for axial travel per screw revolution indicates that the travel will be large when the lead angles differ widely. For the case of one lead angle positive and the other negative, the travel per revolution will be greater than the screw lead.

It is important to recognize that one of the lead angles can be zero. The member with the zero lead angle does not then contain threads, but rather a set of grooves, with the groove spread being equal to the pitch of the other member. The axial travel formula does not cover this case. If the member with zero lead angle is the nut, the travel per screw revolution will be exactly equal to the screw lead. If the screw has zero lead angle, the travel will be $$\delta = -p_N (D_S/D_N) \qquad \text{VI.}$$

where
$\delta$ = linear travel per rotation of screw
$p_N$ = the nut lead
$D_S$ = the effective screw pitch diameter
$D_N$ = the effective nut pitch diameter The minus sign indicates that retraction of the screw will occur.

An actuator with a nut having zero lead would behave essentially like a simple anti-friction screw, such as a ball screw. It would have the advantage, however, of inherent zero backlash, even after considerable screw or nut wear; and, like all of the other actuators previously described, it could accommodate foreign matter in the threads, or minor deformations of the thread, by allowing lateral displacement of the nut.

Figure 27:
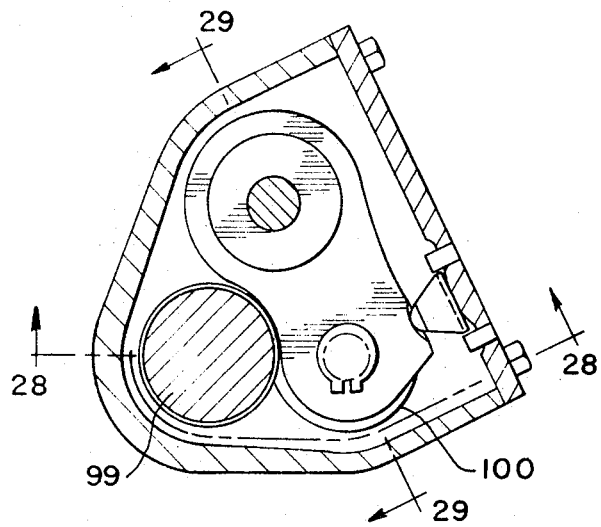
FIG. 27 shows a broken away view of a screw and a roller utilizing the principles of my invention.
Figure 28:
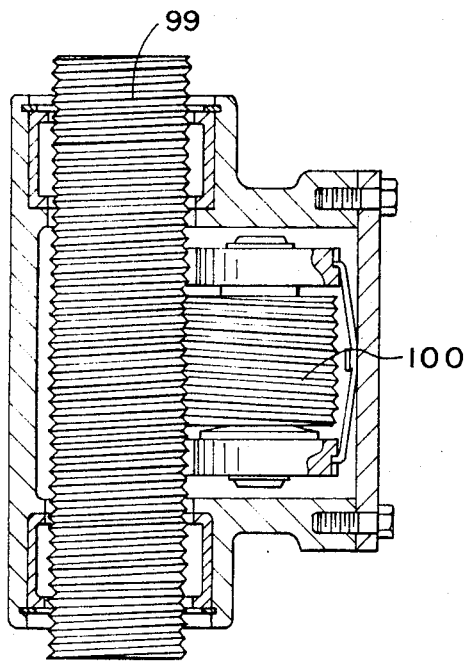
FIG. 28 shows a view of the embodiment of FIG. 27 taken along the line 28—28.
Figure 29:
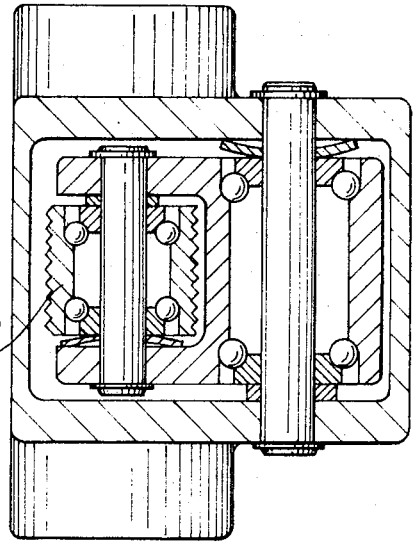
FIG. 29 shows a view of the embodiment of FIGS. 27 and 28 taken along the line 29—29.

All of the embodiments considered heretofore have been based on configurations involving a screw and nut. Actuators can also be constructed in which the screw 99 engages a threaded roller 100, FIGS. 27–29. Such arrangements can be designed to exhibit most of the characteristics previously discussed. For example, if the pitch diameter of the threaded roller is greater than that of the screw, the screw advances. If it is less, the screw retracts. Obviously, a threaded roller could be selected having a mean pitch diameter equal to that of the screw. A roller-screw combination of this type would be used as the basis for an actuator providing load dependent two-direction travel. A compound roller may be used in an analogous fashion to the compound nut, shown in FIG. 24.

In threaded-roller actuators, the effect of loading on rate of travel is exactly the opposite of that in actuators with nuts. The table below illustrates the behavior of the two types of actuators as loads are increased beyond the critical load. Assume that the thread profiles are such that pitch diameter changes are confined to the roller 100 in the threaded-roller actuator and to the nut in the screw-nut actuator. The load can be in either direction.

| actuator type | changes in contact diameter | changes in lead angle | changes in rate of travel |
|---|---|---|---|
| actuator with nut | decrease | increase | decrease if advancing; increase if retracting; |
| actuator with threaded roller | increase | decrease | decrease if retracting; increase if advancing; |

A threaded-roller actuator, of course, requires a positive stop for lateral displacement of the roller to prevent disengagement of the roller from the screw. In this respect, it is the same as screw-nut actuators having nut inside diameters greater than screw outside diameters.

The lead of the threads of the threaded roller need not be the same as that of the screw. That is, a multiple-thread roller may be used with a single thread screw and vice-versa. The multiple lead roller would afford the same advantage vis-a-vis contact stress cycles as a multiple lead nut.

Some of the advantages of my invention are:
zero back-lash,
very low axial travel per revolution,
self-protection from driving overload,
automatic displacement compensation,
automatic load compensation, and
infinitely variable axial travel per revolution.

Other advantages are pointed out in the discussion of the specific embodiments of my invention found in the previous description.

The foregoing is a description of the illustrative embodiments of the invention, and it is applicant's intention in the appended claims to cover all forms which fall within the scope of the invention.

What is claimed is:

1. A mechanism for converting rotary motion into linear motion comprising:
    a first threaded member,
    a second threaded member having threads adapted for continuous engagement with said first threaded member at least at one point of contact,
    means for allowing said second member to rotate freely,
    means for restricting the displacement of said second member along a single path between greater and lesser thread engagement with said first threaded member, and
    bias means for pressing said second member toward full threaded engagement with said first member.

2. A mechanism for converting rotary motion into linear motion as set forth in claim 1 comprising further:
    means for precompressing said elements of said mechanism whereby backlash is avoided 3. A mechanism for converting rotary motion into linear motion as set forth in claim 1 in which said first threaded member comprises,
    a threaded shaft.

4. A mechanism for converting rotary motion into linear motion as set forth in claim 3 in which said second threaded member comprises,
    a nut surrounding said shaft and having internal threads of a greater pitch diameter than the threads of said shaft.

5. A mechanism for converting rotary motion into linear motion as set forth in claim 1 in which said means for allowing said second member to rotate freely comprises,
    first anti-friction bearing means disposed around said nut for allowing said nut to rotate freely about said shaft.

6. A mechanism for converting rotary motion into linear motion as set forth in claim 5 in which said anti-friction bearing means comprises,
    a first external ring having a first internal raceway, and
    a second raceway on the external surface of said nut for cooperating with said first internal raceway.

7. A mechanism for converting rotary motion into linear motion as set forth in claim 6 in which said means for restricting the displacement of said second member comprises,
    guide means to each side of said external ring for restricting the displacement of said nut to a single path between a position toward the first threaded member to a position away from the first threaded member.

8. A mechanism for converting rotary motion into linear motion as set forth in claim 7 further comprising:
    second bearing means mounted for rotational support of said shaft.

9. A mechanism for converting rotary motion into linear motion as set forth in claim 7 further comprising:
    third and fourth bearing means mounted above and below said first external ring for rotational support of said nut,
    a first and a second nut centering crescent mounted opposed to said third and fourth bearing means for bringing the longitudinal axis of said nut into alignment with the longitudinal axis of said shaft,
    a braking surface on said nut,
    brake means adapted for pushing said nut from full engagement with said threaded shaft toward said nut centering means and for stopping rotation of said nut when said nut is pressed against said first and second nut centering crescent, and
    the internal pitch diameter of said nut is less than the external pitch diameter of said threaded shaft.

10. A mechanism for converting rotary motion into linear motion as set forth in claim 1 in which said second threaded member comprises,
    a thread extending spirally along the interior of said threaded member and at least one flank of the thread has a profile different from that of the flank of the thread of said first member.

11. A mechanism for converting rotary motion into linear motion as set forth in claim 1 in which said first threaded member comprises,
    a thread extending spirally along the exterior of said threaded member and each flank of the thread has a convex profile.

12. A mechanism for converting rotary motion into linear motion as set forth in claim 11 in which said second threaded member comprises,
    a nut having threads extending spirally along the interior of said nut and each flank of the thread has a flat profile.

13. A mechanism for converting rotary motion into linear motion as set forth in claim 11 in which said second threaded member comprises,
    a nut having threads extending spirally along the interior of said nut and each flank of the thread has a convex profile.

14. A mechanism for converting rotary motion into linear motion as set forth in claim 11 in which said second threaded member comprises,
    a nut having threads extending spirally along the interior of said nut and each flank of the thread has a concave flank of a radius of curvature greater than that of said convex profile of said first threaded member.

15. A mechanism for converting rotary motion into linear motion as set forth in claim 14 in which said second bias means comprises, a spring which exerts greater force than said first bias means.

16. A mechanism for converting rotary motion into linear motion as set forth in claim 1 further comprising:

a second bias means for resisting motion of said second member when said second member has moved a predetermined distance against said first bias means along said single path away from full engagement with said first member.

17. A mechanism for converting rotary motion into linear motion as set forth in claim 1 in which said second threaded member comprises, a compound nut having a first and a second nut element, each having internal threads of a greater pitch diameter than said first member and being adapted for relative movement only along the longitudinal axis of said compound nut.

18. A mechanism for converting rotary motion into linear motion as set forth in claim 17 comprising further, means for moving said second nut element axially with respect to said first nut element whereby the axial position of said first and second nut elements in respect to each other is varied to cause the ratio of rotary motion to linear motion of said first threaded member to vary with the different axial positions of said first and second nut elements.

19. A mechanism for converting rotary motion into linear motion as set forth in claim 1 in which, said first threaded member has a lead which is an integral multiple of the lead of said second threaded member.

20. A mechanism for converting rotary motion into linear motion as set forth in claim 19 in which, said first threaded member is a nut, and said second threaded member is a shaft.

21. A mechanism for converting rotary motion into linear motion at an infinitely variable rate comprising:

a first threaded member, a compound threaded member having a first and a second threaded element, each having threads adapted for continuous engagement with said first threaded member on at least one point of contact, means for allowing said compound threaded member to rotate freely, bias means for pressing said compound threaded member toward full engagement with said first threaded member, means for restricting the displacement of said compound threaded member along a single path between greater and lesser thread engagement with said first threaded member, means for moving one of said first and second threaded elements axially relative to said first threaded member whereby the position of said first and second threaded element is varied relative to said first threaded member and the direction of linear motion of said first threaded member may be reversed as well as infinitely varied.

22. A mechanism for converting rotary motion into rectilinear motion as set forth in claim 21 in which said compound nut comprises, a first and a second nut element each having an internal diameter which is about equal to an integral multiple of the diameter of said shaft and is at least twice the diameter of said shaft, and at least a double thread having the same pitch as the threads on said shaft and extending around the interior of each said nut.

23. A mechanism for converting rotary motion into linear motion at an infinitely variable rate comprising, a rotatable lead screw having external threads of a given diameter, a compound nut having a first and a second nut element, each having internal threads of a greater diameter than the threads of said lead screw, a first race formed on the exterior of said first nut element, means for connecting said nut elements to allow relative axial motion but hold said nut elements from relative rotational motion, a first anti-friction bearing means mounted for rotational support of said lead screw, a second anti-friction bearing means mounted for rotational support of said nut and having its center line coincident with the center line of said nut and parallel to the center line of said shaft and comprising, a first race on the exterior of said first nut element, a second race formed on the interior of an external ring, means for pressing said nut toward said rotatable lead screw and for restricting the movement of said nut to a direction normal to the center line of said lead screw, and means for moving said second nut axially with respect to said first nut whereby the position of said first and second nut, in respect to said lead screw, is varied to cause the ratio of rotary motion to linear motion of said lead screw to vary with the varying position of said second nut.

24. A mechanism for converting rotary motion into linear motion at an infinitely variable rate as set forth in claim 23 in which said pressing and restricting means comprises, means for restricting the movement of said second anti-friction bearing means to a direction normal to the centerline of said screw, and bias means for pressing the external ring of said second anti-friction bearing means toward said slidable means.

25. A mechanism for converting rotary motion into linear motion comprising:

a first threaded member, a second threaded member having threads adapted for continuous engagement with said first threaded member at least at one point of contact, bearing means for allowing said second threaded member to rotate freely, and bias means for pressing said second threaded member toward full engagement with said first threaded member.

26. A mechanism for converting rotary motion into linear motion as set forth in claim 25 in which said second threaded member comprises, a roller having external threads.

27. A mechanism for converting rotary motion into linear motion as set forth in claim 25 in which said second threaded member comprises, a member having a cylindrical surface, and at least one thread extending around said surface and each said thread having zero lead angle whereby the threads of said first and second members mesh to cause the mechanism to operate like a simple anti-friction screw.

28. A method of converting rotary motion into linear motion comprising the steps of, rotating a first threaded member having a longitudinal axis, allowing a second threaded member having threads adapted for continuous engagement with said first threaded member to rotate freely, and urging the threads of said second threaded member laterally against the threads of said first threaded member.

29. A method of converting rotary motion into linear motion as set forth in claim 28 comprising the further steps of, shaping the flank profile of the threads of at least one member to be other than flat.

30. A method of converting rotary motion into linear motion as set forth in claim 29 comprising the further step of, applying a force to the first threaded member along its longitudinal axis whereby the threads of said first threaded member are urged along the direction of the longitudinal axis of said first member and a lateral force is applied to the threads of said second member.

31. A method of converting rotary motion into linear motion as set forth in claim 30 further comprising the step of, moving said second threaded member to a position where its longitudinal axis is coincident with the longitudinal axis of said first threaded member and the threads are in contact along their length, and stopping the rotation of said second threaded member whereby said first and second threaded members operate like a conventional nut and bolt.

32. A method of converting rotary motion into linear motion as set forth in claim 29 comprising the further steps of, placing a third threaded member having the same pitch diameter as said second threaded member to rotate with said second threaded member, and moving the longitudinal position of said third threaded member in relation to said second threaded member whereby the amount of engagement of the threads of said first threaded member with said second and third threaded member is changed to vary the effective pitch diameter of the members.

33. A mechanism for converting rotary motion into linear motion comprising:

a first threaded member;

a second threaded member having a different pitch diameter from said first member;

means for allowing said second member to rotate freely;

means for restricting the displacement of said second member along a single path generally lateral to the longitudinal axes of said first and second threaded members to give greater and lesser thread engagement with said first threaded member; and bias means for pressing said second member toward full threaded engagement with said first member.

* * * * *